(12) United States Patent
Milostic et al.

(10) Patent No.: US 8,973,329 B2
(45) Date of Patent: Mar. 10, 2015

(54) BUILDING SYSTEM WITH MULTI-FUNCTION INSULATION BARRIER

(71) Applicant: James Hardie Technology Limited, Dublin (IE)

(72) Inventors: Anthony Milostic, Rosehill (AU); Mary Tysoe, Rosehill (AU); Milton O'Chee, Rosehill (AU)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 13/840,968

(22) Filed: Mar. 15, 2013

(65) Prior Publication Data

US 2013/0312347 A1 Nov. 28, 2013

Related U.S. Application Data

(63) Continuation-in-part of application No. 13/399,829, filed on Feb. 17, 2012, now abandoned, which is a continuation-in-part of application No. PCT/AU2010/001065, filed on Aug. 20, 2010.

(30) Foreign Application Priority Data

Aug. 20, 2009 (AU) ................................. 2009903931

(51) Int. Cl.
*E04B 9/22* (2006.01)
*E04B 1/70* (2006.01)
(Continued)

(52) U.S. Cl.
CPC . *E04B 1/70* (2013.01); *C09J 7/026* (2013.01); *E04B 9/245* (2013.01); *E04B 2/707* (2013.01)
USPC ................. 52/411; 52/408; 428/42.2

(58) Field of Classification Search
CPC ....... E04B 1/74; E04B 1/7608; E04B 1/7612; E04B 1/7654; E04B 1/7675; E04B 2001/7679; E04B 1/78; E04B 2/72; E04B 2/7412; E04B 2/7457; E04B 9/245; E04B 9/26; E04B 2/707; E04F 13/801; E04F 13/0805; E04F 13/0835; E04F 13/075; E04F 13/0875
USPC .......... 52/105, 408–411; 428/42.2, 42.3, 156, 428/187, 317.3, 343, 337
See application file for complete search history.

(56) References Cited

U.S. PATENT DOCUMENTS 3,160,549 A 12/1964 Caldwell et al.
3,998,015 A * 12/1976 Scott et al. ................... 52/406.1
(Continued)

FOREIGN PATENT DOCUMENTS

DE 196 02 557 7/1997
EP 0 247 695 5/1987
(Continued)

OTHER PUBLICATIONS

International Preliminary Report on Patentability; Application No. PCT/AU2010/001065, filing date of Aug. 20, 2010, date of mailing Dec. 13, 2011, 26 pages.
(Continued)

*Primary Examiner* — Joshua J Michener
*Assistant Examiner* — Matthew Gitlin
(74) *Attorney, Agent, or Firm* — Knobbe, Martens, Olson & Bear, LLP

(57) ABSTRACT

The invention relates to a building section including a sub-structure and a cladding member connected in fixed relation relative to the sub-structure. A multi-function elongate, flexible insulating element is disposed between the sub-structure and the cladding member for damping energy transfer between the cladding member and the sub-structure, facilitating alignment of the cladding, and creating a rainscreen configured to drive out moisture from the wall cavities. The flexible insulating element includes a bond breaker disposed on the external surface of the insulating element. The bond breaker prevents externally applied joint sealant compound from adhering to the insulating element. The bond breaker can act as a safeguard to prevent joint sealant deterioration or adhesion to undesired surfaces.

9 Claims, 4 Drawing Sheets

(51) Int. Cl.
*C09J 7/02* (2006.01)
*E04B 9/24* (2006.01)
*E04B 2/70* (2006.01)

(56) References Cited

U.S. PATENT DOCUMENTS

| | | |
|---|---|---|
| 4,333,290 A | 6/1982 | Koberstein |
| 4,828,635 A | 5/1989 | Flack |
| 5,300,171 A * | 4/1994 | Braun et al. ................. 428/41.3 |
| 6,006,481 A | 12/1999 | Jacobs |
| 2008/0104918 A1 | 5/2008 | Gleeson |

FOREIGN PATENT DOCUMENTS

| | | |
|---|---|---|
| EP | 0 896 110 | 2/1999 |
| EP | 1 061 190 | 12/2000 |
| EP | 1 431 471 | 6/2004 |
| EP | 1 457 611 | 9/2004 |
| FR | 2 088 967 | 1/1972 |
| GB | 2 440 803 | 2/2008 |
| WO | WO 98/45545 | 10/1998 |
| WO | WO 02/31281 | 4/2002 |

OTHER PUBLICATIONS

Extended European Search Report; Application No. PCT/AU2010/001065, filed Aug. 20, 2010, date of mailing Aug. 6, 2014, 9 pages.

* cited by examiner

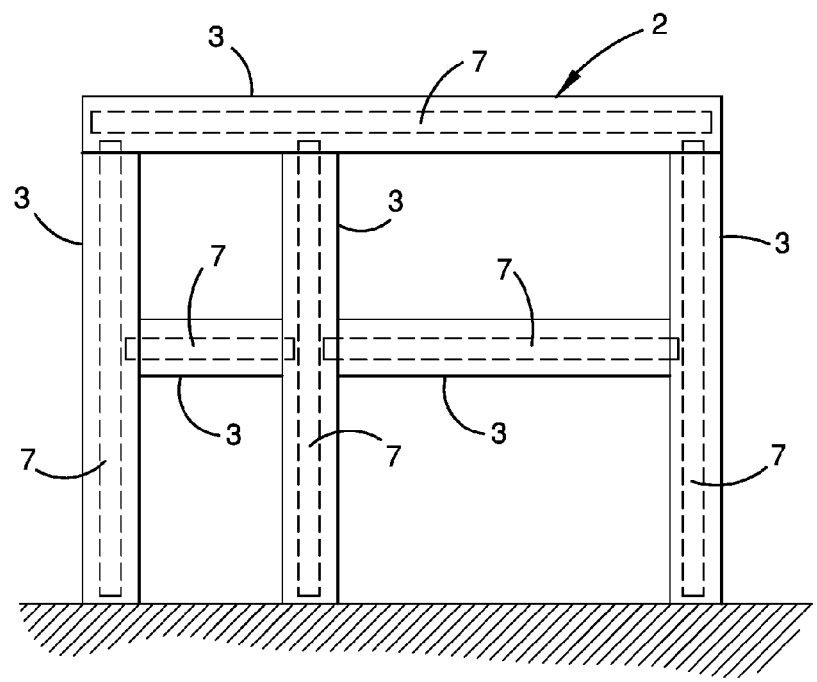
FIG. 4
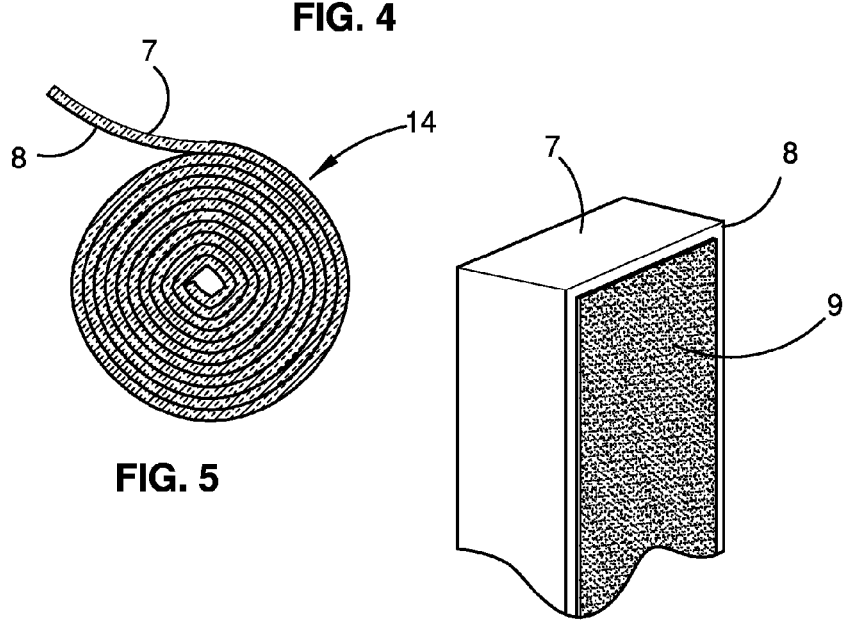
FIG. 5  FIG. 6

BUILDING SYSTEM WITH MULTI-FUNCTION INSULATION BARRIER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The present invention relates generally to the field of building systems and, in particular, to systems incorporating the use of improved materials and construction techniques for insulating, facilitating alignment, and/or providing a rainscreen for a section of a building.

The invention has been developed specifically for use in connection with internal and external cladding systems and will be described primarily with reference to this application.

BACKGROUND OF THE INVENTION

The following discussion of the prior art is intended to enable the invention to be placed in an appropriate technical context and to allow the advantages of it to be fully appreciated. However, any discussion of the prior art throughout the specification should in no way be considered as an admission that such prior art is widely known or forms part of common general knowledge in the field.

With the advent of new and improved cladding materials in a variety of geometrical forms, the popularity of frame plus cladding construction techniques is increasing, particularly in the residential market. At the same time there is increasing demand for energy efficient structures which necessitates, or at least encourages, use of insulating materials between the frame and the cladding of such structures. Furthermore, in most cladding systems, a space is maintained between the exterior wall panels and interior insulation layer to serve as a rainscreen. The rainscreen deters rainwater intrusion into the building and allows ventilation and removal of any water that may enter the wall cavity.

One difficulty which arises in constructing some cladding systems, is the need to correctly align the mating surfaces of adjacent cladding panels on the frame, and to maintain this alignment after the erection process has been completed. In a cladding system for a wall, it is typically desired to fix the cladding panels to the frame such that a substantially continuous wall surface is defined by each array of panels, be they flat mounted panels or long arrays of panels to be mounted in an overlapping arrangement. However, using popular soft foam thermal insulating strips for example, it is often difficult to achieve such a flat surface at the adjoining or abutting edges of adjacent panels, which reduces the aesthetic appeal provided by the final wall. This difficulty arises, at least in part, due to the physical properties of these soft foam insulating strips and/or irregularities in the frame.

Such misalignment of adjacent cladding panels can give rise to a more serious situation where the building section is a floor of the building. In particular, such misalignment of adjacent panels or floor boards can give rise to undesirable unevenness in flooring. While rigid polystyrene foam alternatives used for walls and high density rubber sheets used for floors reduce this problem to some extent, they are slow to install and awkward to transport.

Another issue which arises with the use of soft foam strips is that, when either hand or gun nailing the cladding panels to the frame, the nails are often over driven such that an indentation is formed in the cladding panel and the head of the nail sits beneath the surface of the panel, again reducing the aesthetic appeal provided by the wall.

It is an object of the present invention to overcome or ameliorate one or more of the disadvantages of the prior art, or to at least provide a useful alternative.

SUMMARY OF THE INVENTION

Various embodiments of the present invention provide building systems that incorporate multi-function insulative barriers adapted to provide insulation, facilitate cladding alignment, and form a rainscreen to drive out moisture. In certain preferred embodiments, the building system includes a building frame having a plurality of studs, an exterior cladding, an interior sheathing, and a plurality of spaced apart elongate multi-functional insulative barriers. Each of the insulative barriers is disposed between the exterior cladding and the interior sheathing and extends along the length of one of the studs so that each of the insulative barriers can be fastened to a respective stud. The insulative barriers together create a clearance space that functions as a rainscreen between the exterior cladding and the interior sheathing. In some embodiments, the insulative barrier further includes indicia configured to facilitate alignment of the exterior cladding during installation. The insulative barriers can be made of a foam material such as foam tape or thermal back tape. In one implementation, the insulative barriers are made of a substantially incompressible foam material. In another implementation, the building system further includes a foam insulative sheathing disposed adjacent the interior sheathing. In yet another implementation, a weather resistant barrier layer can be applied to the interior sheathing as well.

According to another embodiment of the invention, there is provided a multi-function thermal insulative barrier material. The material includes an elongate body made of an insulative material. The insulative material has a thermal conductivity of less than 0.1 K.m$^2$/W. The multi-function thermal insulative barrier material further includes two opposing exterior surfaces. The first exterior surface comprises is an adhesive surface and the second exterior surface is a bond breaker that functions as a sealant release. The bond breaker can be integrally formed, or can be a coating or strip formed on the surface of the insulative barrier material. In a preferred implementation, the thermal insulative material is at least 10 mm thick. In one embodiment, a bond breaker strip comprises a self-sealing tape configured to inhibit moisture infiltration into the body of the insulative material.

According to another embodiment of the invention, there is provided a building section including:

a sub-structure;

a cladding member connected in fixed relation relative to the sub-structure; and an elongate, flexible insulating element, the insulating element having at least one insulating layer which is substantially incompressible and which has a substantially constant density in the range of 200 kg/m3 to 300 kg/m3, wherein the insulating element is disposed between the sub-structure and the cladding member for damping energy transfer between the cladding member and the sub-structure.

The term "substantially incompressible" is used herein to define at least one insulating layer of an insulating element which substantially resists compression during and after fixing between a sub-structure and a cladding member when conventional fasteners are used to secure the cladding member to the sub-structure with the insulating element therebetween.

The term "cladding member" is intended to include all internal or external wall, floor and ceiling covering panels and planks or opening covers such as windows and door frames, as may be secured to a structural frame to define a building envelope.

The substantially incompressible characteristic of the at least one insulating layer results in this layer substantially maintaining its geometric shape when the cladding member is being connected to the sub-structure by fasteners which pass through the insulating element. Desirably, the at least one insulating layer provides support to the cladding member when the cladding member is being secured to the sub-structure. It will be appreciated that this enables cladding materials such as fiber cement panels to be nailed or screwed to the sub-structure using conventional power tools and the like by providing rear support to the material. Advantageously, the substantial incompressibility of the at least one insulating layer helps facilitate the erection of a building section having a substantially continuous cladding surface at the abutting edges of adjacent cladding members. The substantial incompressibility of the at least one insulating layer also helps to inhibit over driving fasteners when using conventional hand and power tools.

In certain preferred embodiments, the insulating element reduces the transfer of thermal energy between the cladding member and the sub-structure. In other preferred embodiments, the insulating element reduces the transfer of acoustic energy between the cladding member and the sub-structure. Preferably, the insulating element reduces the transfer of both thermal and acoustic energy between the cladding member and the sub-structure. In some embodiments, the damping of energy transfer between the cladding member and the sub-structure is primarily effected by the at least one substantially incompressible insulating layer. In other embodiments, the damping of energy transfer is achieved by the combination of the substantially incompressible insulating layer or layers and the remaining layer or layers of the insulating element. That is, in these embodiments, the damping of energy transfer is achieved by the insulating element as a whole.

In certain preferred embodiments, the insulating elements can include an exterior surface that serves as a release for externally applied joint sealant, bondbreaker layer disposed on an external surface of the insulating elements, such as the surface adjacent to the cladding members. The bondbreaker layer is adapted to serve as a release for externally applied joint sealant to prevent the joint sealant from adhering to the insulating elements. Generally, the bondbreaker layer can act as a safeguard to prevent joint sealant deterioration or adhesion to undesired surfaces. The bondbreaker layer can allow the wall to flex and prevent the joint from weakening over time.

In one embodiment, the bondbreaker layer can be a strip with an adhesive-backed layer. The strip has a side that will not bond to the joint sealant and can be made of polyethylene, silicone or the like. The side of the strip that faces the adhesive layer can have properties allowing it to bond to the adhesive layer. In one embodiment, the bondbreaker layer can be a non-adhesive coating such as polyethylene, silicone or the like, applied directly to the external surface of the insulating elements.

The cladding member is preferably connected to the sub-structure via one or more fasteners. Preferably, the one or more fasteners securely engage the sub-structure and the cladding member. At least certain of the one or more fasteners preferably pass through the insulating element to hold the insulating element in a desired position relative to the cladding member/sub-structure. The fasteners are preferably selected from the group including nails, screws, staples and rivets. However, it will be appreciated by those skilled in the art that the fasteners are not limited to those listed here, and that any suitable fastener (including adhesives) may be used to connect the cladding member to the sub-structure.

The at least one insulating layer is preferably formed of a foam, more preferably, a closed cell foam such as, for example, polyolefin. In some preferred forms, the foam is cross-linked. Suitable cross-linked foams include polyurethane and polystyrene. It will of course be appreciated that the closed cell and cross-linked foams are not limited to those listed here, and that other suitable foams may be used.

In addition, it will also be appreciated that the insulating element may, in certain preferred forms, be a homogeneous element such that the overall construction results in a flexible, substantially incompressible insulating element.

However, in other preferred embodiments, the insulating element may be a hybrid or composite element having two or more layers, at least one layer being formed of a material having at least one different physical property relative to the material used to form one or more of the other layers. For example, the insulating element may be a two-layer element having one layer which is relatively 'harder' than the other. Alternatively, the insulating element may be a three-layer element in which the outer layers are relatively 'harder' than the inner layer, or vice versa. In such embodiments, the first 'harder' layer or layers are substantially incompressible and the second 'softer' layer or layers can advantageously deform to account for, or at least reduce the effect of, irregularities in the sub-structure to provide a substantially flat surface across adjacent cladding panels. Accordingly, in embodiments having a 'softer' outer layer, this layer preferably abuts the sub-structure. However, in other embodiments the softer outer layer could abut the cladding member or another intermediate member.

It will of course be appreciated that the insulating element could be embodied in many various differently layered constructions to suit a particular building application.

For multi-layered embodiments of the insulating element, one or more of the physical properties of density, hardness, compressive strength, thermal conductivity, thermal resistance, cross-section and thickness of at least one layer may be configured to be different to that of another layer of the insulating element. It will be appreciated by those skilled in the art that the physical properties which can be varied are not limited to those listed here.

In some embodiments of the insulating element having two or more layers, the thickness of each layer is substantially the same. In other embodiments, the thickness of each layer is different relative to each other.

Preferably, the flexibility of the insulating element enables the insulating element to be wound along its longitudinal axis to form a (spiralled) roll of the insulating element for storage prior to use.

In other embodiments, the insulating element can be supplied as substantially flat strips or "sticks" of a predetermined length. The predetermined length may be suitable for immediate use of the insulating element or for the insulating element to be readily cut-to-length, as desired. In some embodiments, the sticks of the insulating element have a length of approximately 3 m. It will however be appreciated by those skilled in the art that the sticks can be supplied in any desired length, including lengths longer and shorter than 3 m. For example, the insulating element could be supplied in lengths of, but not limited to, 1.0 m, 1.2 m, 1.5 m, 1.8 m, 2.0 m, 2.4 m, 2.5 m, 2.75 m, 3.5 m, 4 m, 4.5 m, 5.0 m or 6.0 m.

Preferably, the density of the substantially incompressible insulating layer is in the range of about 205 kg/m$^3$ to 255 kg/m$^3$. In one particularly preferred embodiment, the density of the insulating layer is approximately 230 kg/m$^3$. In another particularly preferred embodiment, the density of the insulating layer is approximately 300 kg/m$^3$. It will be appreciated that the density of the insulating element is not limited to the values listed here, but rather will be selected to meet the insulating requirements of a particular application.

Preferably the insulating element (or at least one layer of the insulating element) has a hardness at least 60 HD°, as measured under the Durometer Type C hardness standard specified in ASTM D2240. In various other embodiments, the insulating element (or at least one layer of the insulating element) may have a hardness of at least 80 HD, at least 100 HD or at least 200 HD.

The insulating element (or the at least one insulating segment) preferably has a compressive strength in the range of approximately 200 to 400 kPa.

The insulating element (or the at least one substantially incompressible insulating layer) preferably has a constant thickness. Those skilled in the art will appreciate that the constant thickness of the insulating element (or the at least one insulating layer) in combination with the substantially incompressible property helps to fix and maintain adjacent cladding members relative to the sub-structure such that abutting edges are not raised or lowered relative to each other but, rather are substantially flush with each other.

Preferably, the insulating element (or the at least one insulating layer) has a thermal conductivity of less than 0.1 W/m·K. In certain preferred embodiments, the insulating element (or the at least one insulating layer) has a thermal conductivity of less than 0.06 W/m·K. In one particularly preferred embodiment, the insulating element (or the at least one insulating layer) has a thermal conductivity of approximately 0.035 W/m·K.

Preferably, the insulating element (or the at least one insulating layer) is configured to have a thermal resistance, or R-value, of at least 0.1 K.m$^2$/W, more preferably, at least 0.2 K.m$^2$/W. It will of course be appreciated that in other forms, the building section as a whole will be constructed to have a particular R-value to meet the building code of a particular jurisdiction. For example, in Australia the building section may be required to have an R-value of at least 0.2 K.m$^2$/W. In New Zealand, the building section may be required to have an R-value of at least 0.3 K.m$^2$/W.

In certain preferred embodiments having a predetermined cross-section of constant width, the thermal resistance is determined by the thickness of the insulating element(or the at least one insulating layer). The thickness of the insulating element (or the at least one insulating layer) is preferably in the range of about 5 mm to 50 mm. More preferably, the thickness of the insulating element (or the at least one insulating segment) is in the range of about 5 mm to 30 mm. In particularly preferred forms, the thickness of the insulating element (or the at least one insulating layer) is in the range of about 6 mm to 20 mm, with even more preferred forms in the range of 7 mm to 13 mm. In one particularly preferred form, the thickness of the insulating element (or the at least one insulating layer) is approximately 13 mm. In another particularly preferred form, the thickness of the insulating element (or the at least one insulating layer) is approximately 7.5 mm.

Preferably, the insulating element (or the at least one insulating layer) defines a mounting surface for abutting one of the sub-structure and the cladding member. The insulating element (or the at least one insulating layer) preferably includes an attaching means associated with the mounting surface for attaching the insulating element in position. In certain embodiments, the attaching means is used to attach the insulating element to the cladding member. In other embodiments, the attaching means is used to attach the insulating element to the sub-structure. Preferably, the attaching means is a layer of adhesive applied to the mounting surface of the insulating element (or the at least one insulating layer). Preferably, the adhesive is acrylic. In certain preferred forms, a layer of adhesive may also be applied to a surface of the insulating element (or the at least one insulating layer) which is opposite the mounting surface (i.e. the operative outer surface).

It will be appreciated that the adhesive layer on the mounting surface provides the insulating element with the characteristic of a self-adhesive tape and thus facilitates installing the insulating element in the desired position.

In those embodiments in which a layer of adhesive is also applied to the opposite surface to that of the mounting surface, this additional layer of adhesive can be used to hold the cladding members in a desired position relative to the sub-structure (or at least take some of their weight) to facilitate driving fasteners through the cladding members.

In embodiments in which certain fasteners pass through the insulating element, the adhesive layer works in combination with these fasteners to secure the insulating element relative to the cladding member/sub-structure.

In certain preferred forms, the insulating element has a plurality of markings or indicia, the markings being spaced relative to one another on the operative outer surface of the insulating element for facilitating alignment of the cladding members relative to the sub-structure. That is, the markings act as a depth gauge during construction of the building section. Preferably, the markings are configured such that when a top edge of a cladding member is aligned with a marking it follows that the cladding member is correctly aligned relative to the sub-structure, in use. In some forms, the markings are spaced relative to one another to suit a cladding member of a particular size or shape. In other forms, the insulating element can have two or more sets of markings, each set being configured to facilitate alignment of cladding members of a particular size or shape. For example, the insulating element could have three sets of markings including a first set for plank-style cladding members, a second set for sheet-style cladding members and a third set for board-style cladding members. It will be appreciated that pairs of insulating elements with corresponding markings are preferably used to facilitate the alignment of the cladding members. That is, a first insulating element is applied to a first member of the sub-structure and a second insulating element is applied to a second member of the sub-structure whereby the top edge of the cladding member can be aligned with a marking on the first insulating element and a corresponding marking on the second insulating element so that the cladding member is correctly aligned relative to the sub-structure.

Preferably, the sub-structure is a frame having a plurality of frame members. The frame is preferably one of a wall frame, a sub-floor frame, a ceiling frame (including eaves) and a roof frame. However, it will be appreciated by those skilled in the art that the present invention is not limited to the sub-structures listed here.

In certain embodiments, each frame member is formed of metal. Preferably, the metal is steel. In other embodiments, the metal is aluminum. In other preferred embodiments, the frame members are formed of timber.

In some preferred embodiments, the insulating element is close-fittingly disposed between the sub-structure and the cladding member. In other embodiments, the sub-structure includes an intermediate support member connected to a frame member, the support member being arranged intermediate the frame member and the cladding member such that the insulating element is sandwiched between the frame member and the support member or between the support member and the cladding member. In certain embodiments, a first insulating element is provided between the frame member and the support member and a second insulating element is provided between the support member and the cladding member.

The intermediate support member is preferably a top-hat batten, the top-hat batten having a base, two webs extending from the base and a flange associated with the distal end of each web. Preferably, an insulating element is associated with the base and each flange.

It will be appreciate that, in those embodiments in which the frame is a sub-floor frame, the insulating element primarily provides acoustic insulation. Similarly, it will also be appreciated that in those embodiments in which the frame is a wall or ceiling frame, the insulating element is usually selected primarily to provide thermal insulation.

Preferably, the insulating element is attached to one of the frame members of the sub-structure. More preferably, the insulating element is attached to the frame member by the adhesive. The insulating element preferably extends in a direction substantially parallel to the longitudinal direction of the respective frame member. Preferably, an insulating element is attached to one or more of the substantially vertical frame members of the sub-structure. In some embodiments, an insulating element is attached to each substantially vertical frame member. In certain embodiments, an insulating element is also applied to at least one of the substantially horizontal frame members.

The width of the insulating element (or the at least one insulating layer) may be greater than or less than the width of the associated frame member to which it is attached. In certain embodiments, the width of the insulating element (or the at least one insulating layer) is substantially the same as the width of the associated frame member. In the event that double-framing is used, an insulating element may be applied to each frame member.

Preferably, the cladding member is a cladding panel, the cladding panel defining a cladding surface for the building section. It will be appreciated that the cladding member can be an internal cladding member or an external cladding member. More particularly, the cladding member may be internal or external wall sheeting, a ceiling sheet or floor boards. It will also be appreciated that the cladding member can be formed of any suitable cladding material and is preferably formed of one of fiber cement, polystyrene, timber, gypsum board and metal.

Preferably, the building system includes sarking for inhibiting the passage of liquid through the building section, the sarking being arranged between the sub-structure and the cladding member. In some preferred embodiments, the sarking is arranged to be between the sub-structure and the insulating element. In other preferred embodiments, the sarking is arranged to be between the insulating element and the cladding member. The sarking is preferably a membrane of flexible, vapor permeable material. In various embodiments, some of the one or more fasteners are used to secure the sarking in place relative to the cladding member. In other embodiments, a separate fastening means is used to secure the sarking in place. The building section may also include some form of rigid air barrier lining.

It will be appreciated that when strips of the insulating element are applied to the sub-structure, the cladding members will be spaced from the sub-structure such that a cavity or void is formed between the cladding member and the plane on which the mounting surface of the insulating element lies. In certain embodiments, the cavity or void improves the overall efficiency of the insulation associated with the building section by improving the R-value of the building section and/or acts as a rainscreen or drainage passage through which rainwater may pass or evaporate so that this water is not trapped inside the building section. That is, the cavity or void facilitates moisture management within the building section and thus reduces or delays the onset of water damage, advantageously improving the durability of the building section. The thickness of the cavity or void is preferably at least 6 mm. When the thickness of the cavity is 6 mm or greater, the benefit of the moisture management characteristic is most noticeable.

According to yet another embodiment of the invention, there is provided a method of constructing a building section, the method including:

erecting a sub-structure;

connecting a cladding member in fixed relation relative to the sub-structure; and arranging an elongate, flexible insulating element between the sub-structure and the cladding member for damping energy transfer between the cladding member and the sub-structure, the insulating element having at least one insulating layer which is substantially incompressible and which has a substantially constant density in the range of 200 kg/m3 to 300 kg/m3, wherein the insulating element is disposed between the sub-structure and the cladding member for damping energy transfer between the cladding member and the sub-structure.

According to yet another embodiment of the invention, there is provided a method of constructing a building section, the method including:

erecting a sub-structure;

connecting a cladding member in fixed relation relative to the sub-structure; and arranging an elongate, flexible insulating element between the sub-structure and the cladding member for damping energy transfer between the cladding member and the sub-structure, the insulating element having at least one insulating layer which is substantially incompressible and which has a substantially constant density in the range of 200 kg/m3 to 300 kg/m3, wherein the insulating element is disposed between the sub-structure and the cladding member for damping energy transfer between the cladding member and the sub-structure, and wherein the insulating element comprises a bondbreaking layer disposed on a top surface of the insulative element.

In some embodiments, the body of the insulating element is a homogenous construction. In other embodiments, the body of the insulating element is a multi-layered construction. In layered embodiments of the insulating element the body at least one layer is formed of a material having at least one different physical property relative to the material used to form one or more of the other layer or layers. The use of multi-layered insulating elements advantageously enables an insulating element to be constructed so as to be suitable for use with particular cladding and framing materials, to account for irregularities in the cladding and/or framing materials, to account for expected environmental conditions and/or to suit the method of construction used for erecting the building section.

BRIEF DESCRIPTION OF THE DRAWINGS

A preferred embodiment of the invention will now be described, by way of example only, with reference to the accompanying drawings in which:

FIG. 4 is a front view of an embodiment of a frame of the building section;

FIG. 5 is a schematic side view of a roll the insulating element of the building section;

FIG. 6 is a partial perspective view of the insulating element showing the layer of adhesive on the mounting surface;

PREFERRED EMBODIMENT OF THE INVENTION

Figure 1:
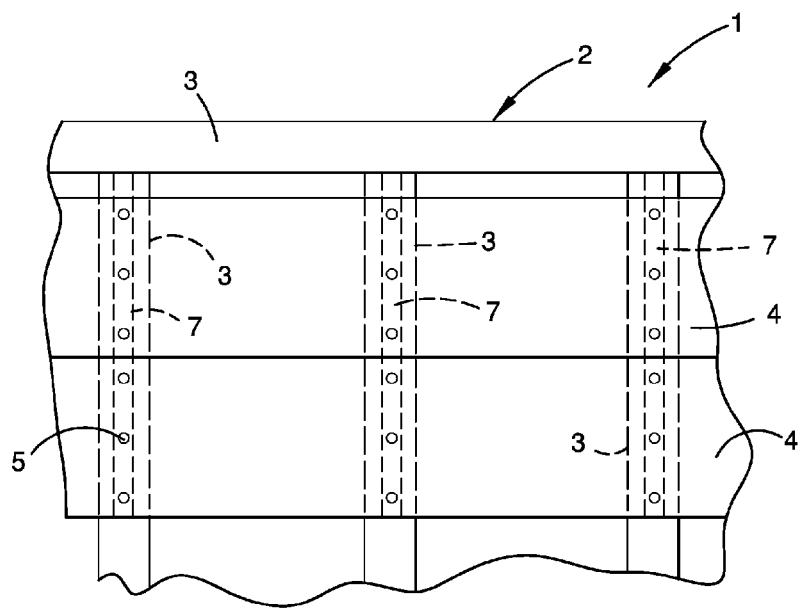
FIG. 1 is a schematic front view of a building section according to the invention.

Referring to the drawings, the building section 1 includes a sub-structure in the form of a frame 2. The frame 2 is formed from a series of interconnected frame members 3 including a plurality of substantially vertical frame members and a plurality of substantially horizontal frame members. As will be described in greater detail below, the frame members 3 may be made from timber or metal such as steel.

For the sake of clarity, the following description will be made with reference to a wall frame. However, those skilled in the art will appreciate that the frame 2 may be a section of any suitable building frame including a wall frame, a sub-floor frame, a ceiling frame and a roof frame. It will be further appreciated by those skilled in the art that the present invention is not limited to the sub-structures listed here. In addition, it is to be understood that certain frames may be inclined, rather than being arranged to lie in a substantially vertical or horizontal plane.

As most clearly shown in FIG. 1, a plurality of cladding members in the form of fiber cement cladding panels 4 are connected in fixed relation relative to the frame 2 by fasteners 5. As will be described in greater detail below, the plurality of cladding panels 4 form a cladding or wall surface 6, such as exterior wall surface, for the building section 1. To facilitate connection of the panels 4 to the frame 2 of the wall section, each cladding panel 4 preferably spans two or more of the frame members 3.

The type of fasteners 5 used to secure the panels 4 to the frame 2 will be primarily determined by the type of material of the frame members 3. That is, fasteners 5 in the form of screws, nails or staples can be used to securely fasten the cladding panels 4 to a timber frame. However, to fasten the panels 4 to a metal frame, it may be necessary to employ screws or rivets. Another factor determining the type of fastener that can be used is the material of the cladding panels. Again, as will be described in detail below, the present invention advantageously enables cladding materials, such as the fiber cement panels 4, to be readily nailed or screwed to the frame 2 using conventional power tools and the like.

In order to provide thermal and/or acoustic insulation to the wall section 1, an elongate, flexible insulating element in the form of a foam tape 7 is arranged along the length of at least some of the substantially vertical frame members 3. As discussed in greater detail below, in some implementations, the elongate, flexible insulating element is configured to create a space between the frame member 3 and panels 4. The space serves as an effective rainscreen that inhibits water intrusion in the wall cavity. In the embodiments described below, the tape 7 is depicted as having a substantially rectangular cross section. It should be appreciated, however, that the shape of the tape 7 can take on other forms (e.g. curved, ribbed, notched, various geometric shapes, etc.) of various different sizes to help facilitate weather resistance.

For the sake of clarity, the following description will be made with reference to a homogenous substantially incompressible insulating element. However, it will be readily appreciated that the insulating element is not limited to such forms and can advantageously be embodied as a hybrid or composite construction having primary layers formed of a substantially incompressible insulating material and second layers formed a material which can deform to account for irregularities in the sub-structure or cladding materials.

The insulating foam tape 7 is applied in strips and positioned to extend in a direction substantially parallel to the longitudinal axis of the associated frame member 3. In the embodiment illustrated in FIG. 2, a strip of foam tape 7 is applied to each vertical frame member 3. However, it will be appreciated that in certain embodiments, it may be sufficient to apply strips of foam tape 7 to only a selected few of the vertical frame members 3. In yet further embodiments such as that shown in FIG. 4, a strip of foam tape 7 can be applied to each vertical and horizontal frame member 3.

Figure 2:
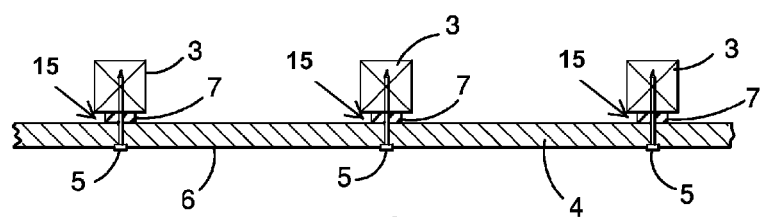
FIG. 2 is a plan view of the building section of FIG. 1.

As most clearly shown in FIG. 2, the foam tape 7 has a rectangular cross-section with a constant thickness along the length of the strip. The insulating foam tape 7 defines a mounting surface 8 on which an attaching means in the form of a layer of acrylic adhesive 9 is applied as illustrated in FIG. 6. The adhesive 9 enables the foam tape 7 to be readily adhered to the relevant frame member 3 in the desired position. It will therefore be appreciated that the adhesive layer 9 provides the foam tape 7 with the characteristic of a self-adhesive tape. In some embodiments, a removable backing strip (not shown) covers the mounting surface 8 to protect the layer of adhesive 9 from dust and other debris during storage of the foam tape 7 prior to use.

The insulating tape 7 is preferably formed of a closed cell, cross-linked foam such as, for example, polyolefin. The insulating element is substantially incompressible such that the insulating element substantially maintains its geometric shape when the cladding member is being fastened to the frame. This property enables the insulating element to provide support to the cladding material when the cladding member is being secured to the sub-structure. In some embodiments, the insulating tape 7 can be designed to maintain shape stability in various storage and climatic environments having varying creepage, moisture and temperature effects.

It will be appreciated that it is this property of substantially incompressibility which enables relatively brittle cladding materials to be nailed or screwed to the frame 2 using power tools and the like. For example, a nail-gun can conveniently be employed to efficiently fasten the panels 4 to the frame 2, without significant variations in the level or degree of compression of the foam tape 7 at the various locations at which the fasteners have been placed.

The significant lack of compression of the foam tape 7 in combination with the degree to which this compression is consistent at the various fastening locations is particularly advantageous at the adjoining/abutting edges of adjacent cladding panels 4. That is, the substantial incompressibility of the foam tape 7 facilitates the erection of a building section 1 having a substantially flush wall surface 6 at the abutting edges of adjacent cladding panels. In other words, the adjoining or abutting edges are not significantly raised or lowered relative to each other as a result of the fastening process. To achieve the required degree of incompressibility, the polyolefin preferably has a substantially constant density of about 230 kg/m$^3$±10%.

In the form shown in the drawings, the width of the foam tape 7 is less than that of the associated frame member to which it is attached. In the illustrated embodiments, the width of the foam tape 7 is approximately 45 mm. The thickness of the foam tape is approximately 13 mm±0.16 mm. It will be appreciated that the tape may be formed in various widths with the thickness of the tape then being selected to provide the insulating tape with a thermal resistance of at least 0.2 K.m$^2$/W (or a thermal conductivity of <0.06 W/m·K).

Each strip of foam tape 7 is adhered directly to the respective frame member 3 by the layer of adhesive 9. A fiber cement cladding panel 4 is then held in position relative to the frame 2, against the foam tape 7. The panel 4 is then secured in the desired position such that each strip of foam tape 7 is disposed between the frame 2 and the associated panel 4. As clearly shown in FIG. 2, at least some of the fasteners 5 pass through the foam tape 7. The adhesive 9 works in combination with these fasteners to securely hold the strip of foam tape 7 relative to the cladding member 4 and frame 2.

In the cladded wall section 1 shown in the drawings, the foam tape 7 forms a thermal break for damping thermal transfer between the cladding panels 4 and the frame 2 to reduce thermal losses through the wall section 1.

It will be appreciated that in those embodiments in which the frame is a roof or ceiling frame, the insulating element again primarily provides thermal insulation. However, in those embodiments in which the frame is a sub-floor frame, the insulating element primarily provides acoustic insulation. In certain applications, including those listed above, the foam tape can provide both thermal and acoustic insulation for the building section 1 and therefore reduce energy losses.

It will be further appreciated that the foam tape 7 may also provide a degree of moisture management for the building section. As shown in FIG. 2, the foam tape 7 is configured to create a clearance space 15 between the frame member 3 and the associated panel 4. In some implementations, the clearance space 15 is configured to resist rain water ingress and may be vented at the bottom to prevent ingress wind forced rain. Thus, the foam tape 7 effectively serves to create a rainscreen to allow ventilation and removal of any water that may enter the wall cavity.

Figure 3:
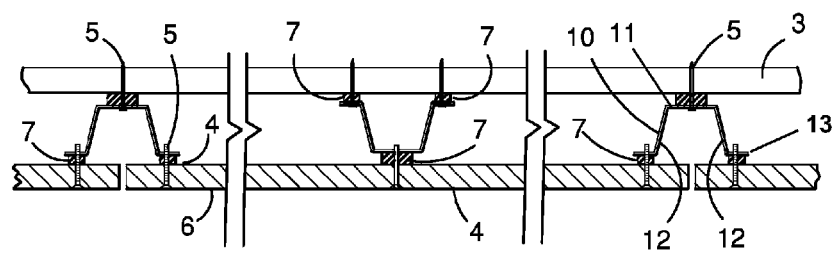
FIG. 3 is a plan view of another embodiment of the building section.

In some preferred embodiments, as illustrated in FIG. 2, the foam tape 7 is close-fittingly disposed between the frame 2 and the cladding panel 4. In other embodiments, as shown in FIG. 3, the frame 2 includes an elongate intermediate support member in the form of a top-hat batten 10. The top-hat batten 10 has a base 11, two webs 12 extending from the base 11 and a flange 13 associated with the distal end of each web 12.

Again referring to FIG. 3, the top-hat batten 10 is arranged to extend substantially parallel to a vertical frame member 3 such that the base 11 overlies the associated frame member 3.

In some embodiments, the base 11 of the top-hat batten 10 is securely fastened to the associated frame member 3 and the cladding panel 4 is fastened to the webs 12 of the top-hat batten 10, the flanges 13 associated with the distal end of each web 12. A strip of foam tape 7 is sandwiched between the frame member 3 and the base 11 of the top-hat batten 10. A strip of foam tape 7 is also sandwiched between each web 12 and the cladding panel 4. In this embodiment, the three strips of foam tape 7 act in combination to provide the desired insulation for damping energy transfer through the building section 1.

In other embodiments, a strip of foam tape 7 may be disposed between the base 11 and the associated frame member 3 only, with no foam tape being applied between the webs and the cladding panel 4.

In one embodiment, the flanges 13 of the webs 12 of the top-hat batten 10 are securely fastened to the associated frame member 3 and the cladding panel 4 is fastened to the base 11 of the top-hate batten 10. A strip of foam tape 7 can be sandwiched between the frame member 3 and the flanges 13 of each 12. A strip of foam tape 7 can also be sandwiched between the base 11 of the top-hate batten 10 and the cladding panel 4.

Referring now to FIG. 5, it can be seen that the flexibility of the insulating foam tape 7 advantageously enables the tape to be wound along its longitudinal axis to form a spiraled roll 14 of the self-adhesive insulating tape 7 for storage prior to use. It will be appreciated that such a roll 14 of self-adhesive insulating tape 7 is compact, convenient to store and easily handled during installation as a thermal break.

Accordingly, it is an advantage of at least a preferred embodiment of the invention to provide a building section 1 having an elongate, flexible insulating element which enables adjacent cladding panels to lie in substantially the same plane such that the edges of adjacent panels are not raised relative to one another.

It is another advantage of at least a preferred embodiment of the invention to provide an elongate, flexible self-adhesive insulating element 7 which can be wound along its longitudinal axis to form a compact spiraled roll 14 for storage and efficient handling and transport of the insulating element. In these and other respects, the invention represents a practical and commercially significant improvement over the prior art.

Figure 7:
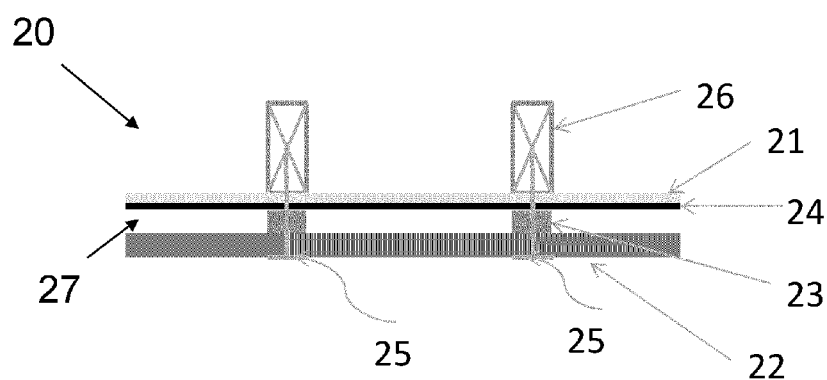
FIG. 7 is a schematic illustration of one embodiment of a wall assembly with multi-function insulative barriers.

FIG. 7 is a schematic illustration of a wall assembly 20, preferably a vertical wall assembly, constructed in accordance with another embodiment of the present invention. As described in greater detail below, the vertical wall assembly 20 incorporates a multi-function barrier layer adapted to provide insulation and moisture management, and facilitate cladding alignment. The wall assembly 20 generally includes wall sheathing 21, cladding 22, and strips of tape 23, preferably thermal break tape or foam insulation tape, interposed between the wall sheathing 21 and cladding 22. In some implementations, a weather resistant barrier layer 24 is disposed on the exterior surface of the wall sheathing 21. The cladding 22 is fastened via fasteners 25 to at least two spaced apart studs 26 that are part of the building frame. The fasteners 25 can be nails, screws, or the like sized to extend through the cladding 22, tape 23, sheathing 21 and into the stud 26. In certain preferred forms, the tape 23 has a plurality of markings or indicia, the markings being spaced relative to one another on the operative outer surface of the tape for facilitating alignment of the cladding 22 relative to the studs.

As shown in FIG. 7, each strip of tape 23 is sandwiched between the cladding 22 and wall sheathing 21 in front of a stud 26, thereby creating a clearance space 27 between the cladding 22 and wall sheathing 21. The width of each strip of tape 23 may be greater than or less than the width of the associated stud 26. In certain embodiments, the width of each strip of tape 23 is substantially the same as the width of the associated stud 26. In certain preferred implementations, the clearance space 27 can be maintained because the tape 23 is substantially not compressible. In some embodiments, the clearance space 27 is very narrow, having a width of about 5 mm to 50 mm, or a width of about 6 mm to 20 mm. The clearance space 27 effectively functions as a rainscreen for the vertical wall assembly 20, which allows circulation of air and removal of condensation by being vented to the atmosphere. Advantageously, application of the tape 23 at strategic locations as described herein provides not only an effective lightweight insulation barrier over studs but also an effective insulative air barrier over bays.

Figure 8:
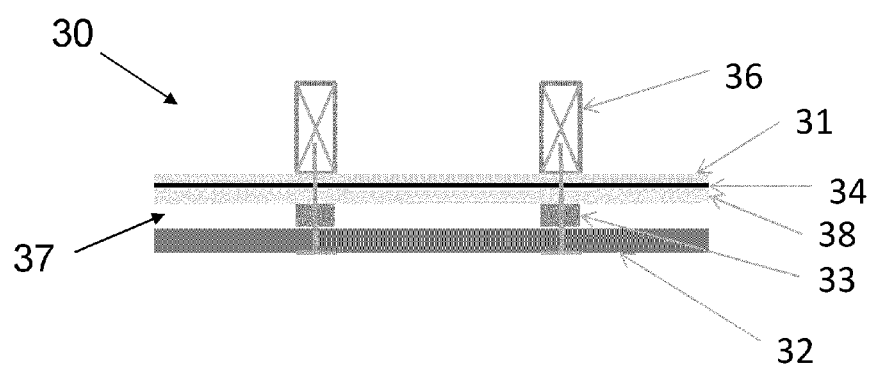
FIG. 8 is a schematic illustration of another embodiment of a wall assembly with multi-function insulative barriers.

FIG. 8 is a schematic illustration of a wall assembly 30, preferably a vertical wall assembly, constructed in accordance with another embodiment of the present invention. Similar to the wall assembly 20 shown in FIG. 7, the wall assembly 30 generally includes wall sheathing 31, cladding 32, and strips of tape 33, preferably thermal break tape or foam insulation tape, interposed between the wall sheathing 31 and cladding 32. In some implementations, the wall assembly 30 further includes an insulation or foam insulative sheathing 38 disposed adjacent to the sheathing 31. The foam insulative sheathing 38 further improves the insulation R-value of the wall assembly. In one embodiment, a weather resistant barrier layer 34 is disposed on the exterior surface of the wall sheathing 31. In other embodiments, the weather resistant barrier layer 34 can be applied to the exterior surface of the foam insulative sheathing 38. As illustrated in FIG. 8, the cladding 32 is fastened via fasteners to at least two spaced apart studs 36 that are part of the building frame. The fasteners can be nails, screws, or the like sized to extend through the cladding 32, tape 33, foam insulative sheathing 38, sheathing 31 and into the studs 36. In certain preferred forms, the tape 33 has a plurality of markings or indicia, the markings being spaced relative to one another on the operative outer surface of the tape for facilitating alignment of the cladding 32 relative to the studs. The tape 33 also creates a clearance space 37 between the cladding 32 and the foam insulative sheathing 38. The clearance space 37 can serve as an effective rainscreen to inhibit rain or moisture from entering the building structure.

Figure 9A:
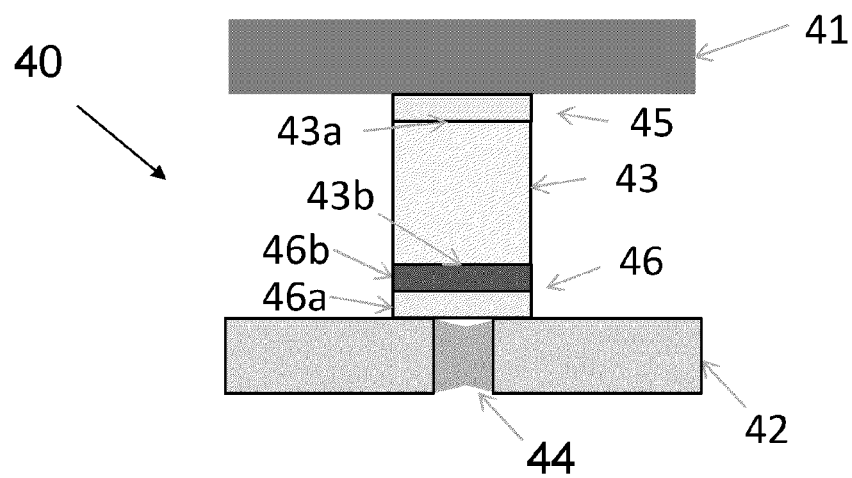
FIG. 9A is a partial schematic illustration of one embodiment of a portion of a wall assembly with multi-function insulative barriers.

FIG. 9A is a schematic illustration of a portion of a wall assembly 40, such as a vertical wall assembly, with a thermal break 43 according to one embodiment. Similar to the wall assemblies 20, 30 illustrated in FIGS. 7 and 8, the wall assembly 40 generally includes wall sheathing 41 and cladding 42. As described with reference to FIGS. 7 and 8, the cladding 42 is fastened via fasteners to the wall studs that are part of the building frame (not illustrated). As described previously, the thermal break 43 can be in the form of a rigid thermal break tape or foam insulation tape, interposed between the wall sheathing 41 and cladding 42.

In some embodiments, the thermal break 43 can be a composite with two or more layers. The first layer can be a substantially incompressible insulating layer and a second layer can be more deformable than the substantially incompressible insulating layer so as to readily adapt to irregularities in the cladding and/or building structure. In one embodiment, the thermal break 43 can be made of a dual layer density configuration of material, preferably made out of a polyolefin insulating material or similar insulating material. In some implementations, a weather resistant barrier layer can be disposed between the sheathing 41 and the thermal break 43 as described with reference to FIG. 8. In certain preferred forms, the thermal break 43 has a plurality of markings or indicia, the markings being spaced relative to one another on the operative outer surface of the thermal break 43 for facilitating alignment of the cladding 42 relative to the studs. In one embodiment, the thermal break 43 can include an adhesive layer 45 on the mounting surface 43a of the thermal break 43 (i.e., the surface adjacent the wall sheathing 41). In some embodiments, a removable backing strip (not illustrated) can cover the mounting surface 43a to protect the layer of adhesive 45 from dust and other debris during storage prior to use.

With further reference to FIG. 9A, the cladding 42 can be joined at the interfaces between adjacent boards with a joint sealant 44. The joint sealant 44 can act to seal the joints and openings between two or more boards 42 and prevent air, water and other environmental elements from entering or exiting the building structure. Additionally, the joint sealant 44 can permit limited movement of the boards 42 (e.g., extension and/or compression) without breaking. In some embodiments, one of the outer surfaces 46 of the thermal break 43, preferably the surface adjacent to the cladding 42, is configured to serve as a sealant release or a bond breaker. In a further embodiment of the invention the material of the thermal break 43 is such that the insulating material serves to act as a sealant release or a bond breaker. In another embodiment of the invention, the thermal break 43 further includes a releasing agent which serves to act as a sealant release or a bond breaker. The bond breaker 46 can be positioned adjacent the joint sealant 44 to allow the joint sealant 44 to adhere to adjacent boards 42 and prevent the joint sealant 44 from adhering to the thermal break 43. Generally, the bond breaker 46 can act as a safeguard to prevent joint sealant deterioration or adhesion to undesired surfaces. The bond breaker 46 can allow the wall to flex and prevent the joint from weakening over time. Advantageously, the bond breaker 46 on the thermal break 43 eliminates the need for applying a separate bond breaker tape between the sealant and the cladding.

Incorporating the thermal strip 43 with the bond breaker 46, the joint sealant 44 can be directly applied to the thermal strip 43. The bond breaker 46 can allow for a reduced number of components of the system by eliminating the use of separate bond breaker tape or the like, which can thereby simplify the installation steps, reduce costs and reduce the required installation time of the wall assembly 40.

The bond breaker 46 can be integrally formed with the thermal break 43 or can be applied to the thermal break 43. In one embodiment, illustrated in FIG. 9A, the bond breaker 46 can be in the form of a strip 46a with an adhesive layer 46b. The strip 46a has an exterior surface that is formulated to not bond to the joint sealant 44 and can serve as a sealant release. In some implementations, the exterior surface of the strip 46a can be made of polyethylene, silicone or the like. The side of the strip 46a that faces the adhesive layer 46b can have properties allowing it to bond to the adhesive layer 46b. In one embodiment, the bond breaker 46 strip can be a self-sealing tape configured to inhibit moisture infiltration into the body of the insulative material.

Figure 9B:
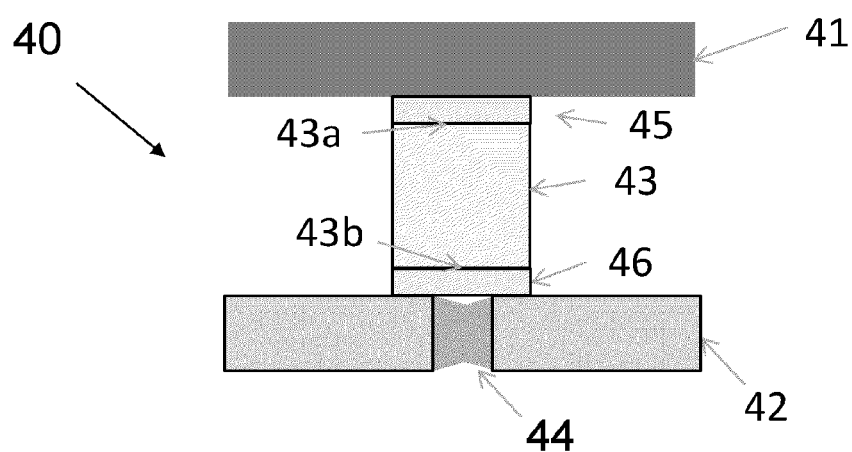
FIG. 9B is a schematic illustration of another embodiment of a portion of a wall assembly with multi-function insulative barriers.

In one embodiment, illustrated in FIG. 9B, the bondbreaker layer 46 can be a non-adhesive coating, such as polyethylene, silicone or the like, applied directly to the external surface 43b of the thermal strip 43 or integrally formed with the bond break 43.

In one embodiment, the bond breaker 46 can have a width that is substantially the same width as the other components of the thermal strip 43. Preferably, the bond breaker 46 is sized to cover at least the portion of the thermal strip 43 that abuts the joint sealant 44.

Although the invention has been described with reference to specific examples it will be appreciated by those skilled in the art that the invention may be embodied in many other forms.

What is claimed is:

1. A building section comprising:
a sub-structure;
a plurality of cladding members connected in fixed relation relative to the sub-structure, wherein a sealant is disposed between adjacent cladding members; and
an elongate, flexible, insulating element, the insulating element having at least one insulating layer which is substantially incompressible and which has a substantially constant density in the range of 200 kg/m3 to 300 kg/m3, wherein the insulating element is disposed between the sub-structure and the cladding member for damping energy transfer between the cladding member and the sub-structure, wherein an exterior surface of the insulative element comprises a bond breaker, said bond breaker functions as a sealant release and prevents the sealant from adhering to the insulating element;
wherein the at least one substantially incompressible layer of the insulating element has a hardness of at least 60 HD.

2. The building system of claim 1, wherein the insulative element further comprises an adhesive layer.

3. The building system of claim 1, wherein the bond breaker comprises silicone.

4. A building section according to claim 1, wherein the insulating element further comprises two or more layers with a first layer being the at least one substantially incompressible insulating layer and a second layer being more deformable than the substantially incompressible insulating layer so as to readily adapt to irregularities in the cladding and/or building structure.

5. A building section according to claim 1, wherein the at least one substantially incompressible layer of the insulating element has a thermal conductivity of less than 0.1 W/m·K.

6. A building section according to claim 1, wherein the thickness of the insulating element is in the range of about 5 mm to 50 mm.

7. A building section according to claim 1, wherein the insulating element has a plurality of markings, the markings being spaced relative to one another on an outer surface of the insulating element for facilitating alignment of the cladding members relative to the sub-structure.

8. A building section according to claim 1, wherein the sub-structure includes an intermediate support member connected to a frame member, the support member being arranged intermediate the frame member and the cladding member such that the insulating element is sandwiched between the frame member and the support member or between the support member and the cladding member.

9. A building section comprising:
a sub-structure;
a plurality of cladding members connected in fixed relation relative to the sub-structure, wherein a sealant is disposed between adjacent cladding members; and
an elongate, flexible, insulating element, the insulating element having at least one insulating layer which is substantially incompressible and which has a substantially constant density in the range of 200 kg/m3 to 300 keg m3, wherein the insulating element is disposed between the sub-structure and the cladding member for damping energy transfer between the cladding, member and the sub-structure, wherein an exterior surface of the insulative element comprises a bond breaker, said bond breaker functions as a sealant release and prevents the sealant from adhering to the insulating element:
wherein the at least one substantially incompressible layer of the insulating element has a compressive strength in the range of approximately 200 kPa to 400 kPa.

* * * * *